United States Patent [19]
Licari

[11] Patent Number: 6,158,487
[45] Date of Patent: Dec. 12, 2000

[54] MITER JOINT KEYING SYSTEM

[76] Inventor: Joseph P. S. Licari, 8221 Cedar Mesa Ave., Las Vegas, Nev. 89129

[21] Appl. No.: 09/314,264

[22] Filed: May 18, 1999

[51] Int. Cl.[7] ...................................................... B27C 5/00
[52] U.S. Cl. ........................ 144/144.51; 144/87; 144/353; 144/355; 144/360; 144/371; 144/144.1; 144/219; 144/240; 409/130
[58] Field of Search ........................... 144/144.1, 144.51, 144/85, 87, 353, 355, 136.95, 136.1, 218, 219, 240, 345, 359, 360, 363, 371; 409/125, 130, 178, 182

[56] References Cited

U.S. PATENT DOCUMENTS 4,373,562  2/1983  Vernon ............................. 144/144.51
4,542,776  9/1985  Kehoe ................................... 144/144.1

*Primary Examiner*—W. Donald Bray
*Attorney, Agent, or Firm*—Dillis V. Allen, Esq.

[57] ABSTRACT

A keying system for a miter joint with a work holder for engaging the outer surfaces of the boards when assembled. A flat planar tool guide is fixed to the work holder and has a slot that receives and guides a router tool to cut a slot through both boards triangularly shaped in its longitudinal direction and shaped in cross section as the cutting tool. Keys having a shape complementary to the slots in both directions are fixed in the slots to both decorate and support the joint.

8 Claims, 5 Drawing Sheets

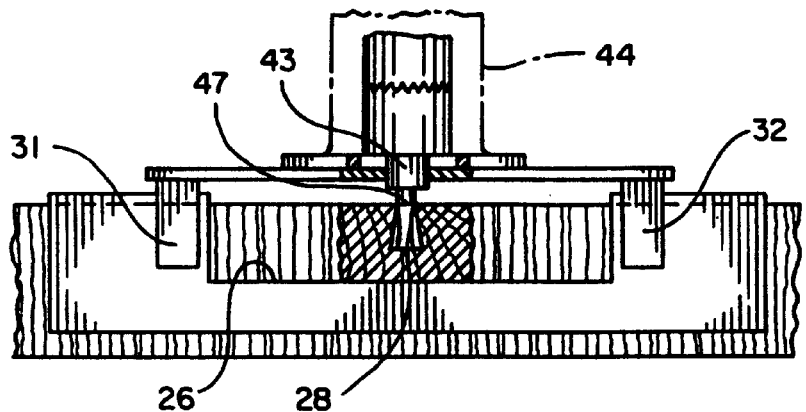
Fig. 2
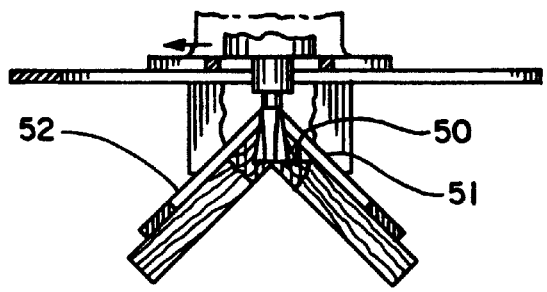
Fig. 3
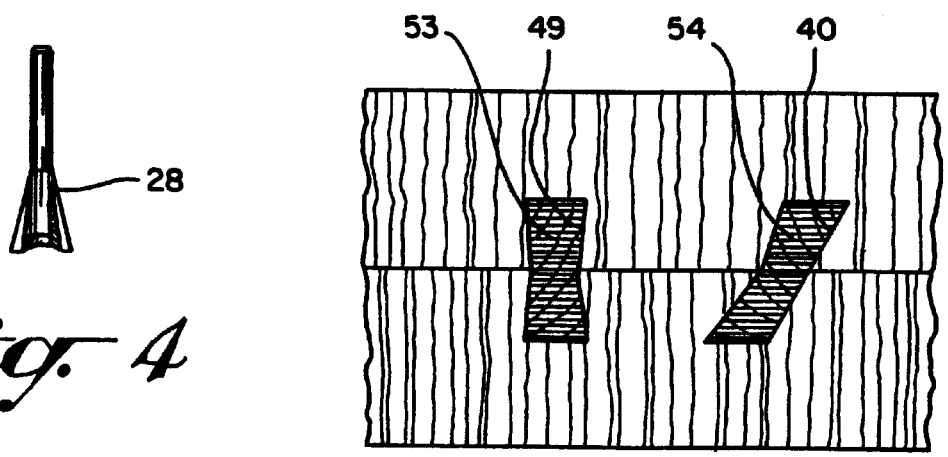
Fig. 4
Fig. 5

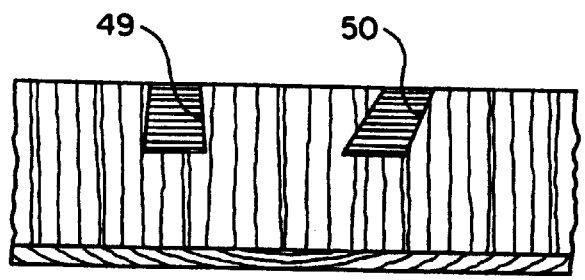
Fig. 6
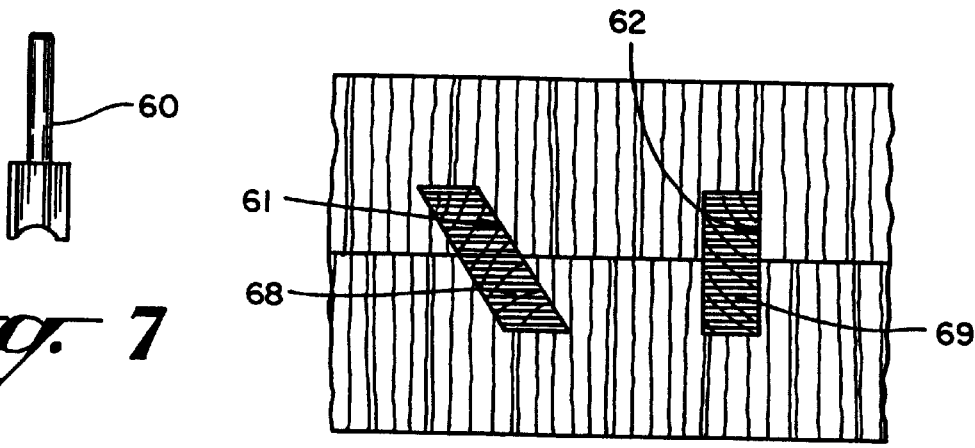
Fig. 7
Fig. 8
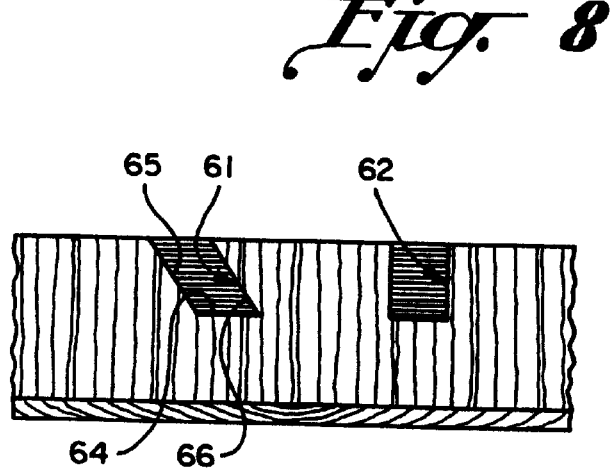
Fig. 9

MITER JOINT KEYING SYSTEM

BACKGROUND OF THE INVENTION

Dovetail joints have been utilized for many hundreds of years to lock the ends of two boards, usually when the boards are at 90 degree angles with respect to one another. Such dovetail joints are extremely strong because they are formed with interengaging projections and slots that taper in both orthogonal directions. Dovetail joints can either be full joints, or they can be blind joints where the tongues on one board engage in blind or closed end slots in the other board.

While such dovetail joints have a high strength, they are not really suitable for visible external joints because of their unattractive and rather commonplace appearance. Therefore, to a large degree dovetail joints are utilized in furniture areas, for example, mostly at joints that are not externally visible.

Another disadvantage in dovetail joints is that they cannot be utilized with miter joints because of their fundamental construction, and of course, miter joints are usually utilized at corner locations that are exterior to the piece, and thus visible, where appearance is important.

Another disadvantage in dovetailing systems is that the machinery utilized for guiding the routing tool that forms these double-tapered slots in the board ends is extremely expensive. These tool guiding systems include a plurality of elongated fingers, each pair of which have converging guide surfaces to guide the routing tool pilot, and hence the cutting tool, in an angular direction as the tool passes through the board to form an axial taper to the slot. The opposite, orthogonal taper, is achieved by the use of a tapered cutting tool, more specifically one that has a wider distal end than at its shank end. That is, the flute diameter at the distal end of the tool has a larger diameter than the flutes where they join the tool shank.

The construction of such dovetailing jigs, and the manner of utilizing such jigs in the cutting of the slots, are described in detail in a Guide entitled "Leigh Dovetail Jig", D4 User Guide, published by Leigh Industries, Ltd., Port Coquitlam, B.C. Canada, copyrighted 1997.

A further problem in the dovetailing systems is that the cuts made must be made, of course, in the board ends prior to assembly, so that they cannot be used to dovetail a joint that has already been assembled, such as an existing furniture piece that needs repair.

There have been also provided in the past miter joint machines for cutting slots at the board ends that receive "biscuits", and sometimes these systems are referred to as "biscuit cutting systems". This system, however, is similar to dovetailing, and not nearly as strong, and includes a guide for cutting a straight internal slot in the mitered end surface of each board prior to assembly. The biscuits are elongated, rectangular pieces that are glued in one slot and then inserted into the slot in the other board as the joint is being assembled.

As noted above, this biscuit miter jointing is not strong and has the disadvantage that it cannot be utilized to provide decorative inserts at the joints because the biscuits are completely internal to the joint itself.

It is a primary object of the present invention to ameliorate the problems noted above in two board corner joints.

SUMMARY OF THE PRESENT INVENTION

In accordance with the present invention, a keying system is provided for miter joints with a work holder for engaging the outer surface of the boards when assembled. A flat planar tool guide is fixed to the work holder and has a slot that receives and guides a router tool to cut a slot through both boards triangularly shaped in a longitudinal direction and shaped in cross section the same as the cutting tool that forms the slot. Keys having a shape complementary to the slots in both directions are fixed in the slots to both decorate and support the joint.

The flat planar tool guide is indexible in a direction perpendicular to its own plane so that the tool may be guided to cut the key slots at the miter joint at an angle other than 90 degrees with respect to the miter plane, which is the common plane of the engaging mitered end surfaces of the two boards.

Also, a plurality of V blocks at different angles are fixed between the work holder and the tool guide to accommodate joints at angles other than 90 degrees, such as in hexagonal or octagonal enclosed side walls.

Because this keying system cuts the key slots in the adjacent boards when assembled, it can be utilized to cut key ways and key corners of furniture in already constructed and finished furniture to either enhance the appearance of that furniture with decorative keys or to reinforce furniture joints that have decreased in integrity through the years.

The keys themselves, because they are visible at the exterior of the joint, can be constructed in colors contrasting to the boards or can be constructed of a different material, and according to the present invention, either cut from wood or can be molded, cast, or cut from synthetic materials, such as plastic or mother of pearl.

The present miter joint key system has significant advantages over dovetailing machinery, particularly because the present system can be manufactured and sold at a fractional cost to dovetailing systems, and of course as noted, dovetailing systems cannot be utilized on assembled joints. Furthermore, dovetailing systems cannot be used on miter joints, which have a significantly better exterior appearance than dovetailing joints, which can only be utilized at butt joints.

Other objects and advantages of the present invention will appear more clearly from the following detailed description.

BRIEF DESCRIPTION OF THE DRAWINGS

FIG. 2 is a longitudinal section through the work holder and tool guide illustrated in FIG. 1, taken generally along line 2—2 of FIG. 1, with the work holder in position on the miter join FIG. 3 is a cross section taken generally along line 3—3 of FIG. 1, with the work holder in position and in an orthogonal direction with respect to FIG. 3;

FIG. 4 is a side view of a tapered flute router cutter, which is exemplary of just one of a plurality of router cutting tools that may be utilized in the present invention;

FIG. 5 is a top exterior view of a miter joint with two different keys in two different type slots at the joint with two different slots formed by the cutting tool illustrated in FIG. 4;

FIG. 6 is a side view of the joint illustrated in FIG. 5;

FIG. 7 is a side view of a straight-sided routing cutter;

FIG. 8 is a top view of the exterior of a miter joint having two different type slots and keys with the slots being formed by the tool in FIG. 7;

FIG. 9 is a side view of the miter joint illustrated in FIG. 8;

DETAILED DESCRIPTION OF THE PREFERRED EMBODIMENT

Figure 1:
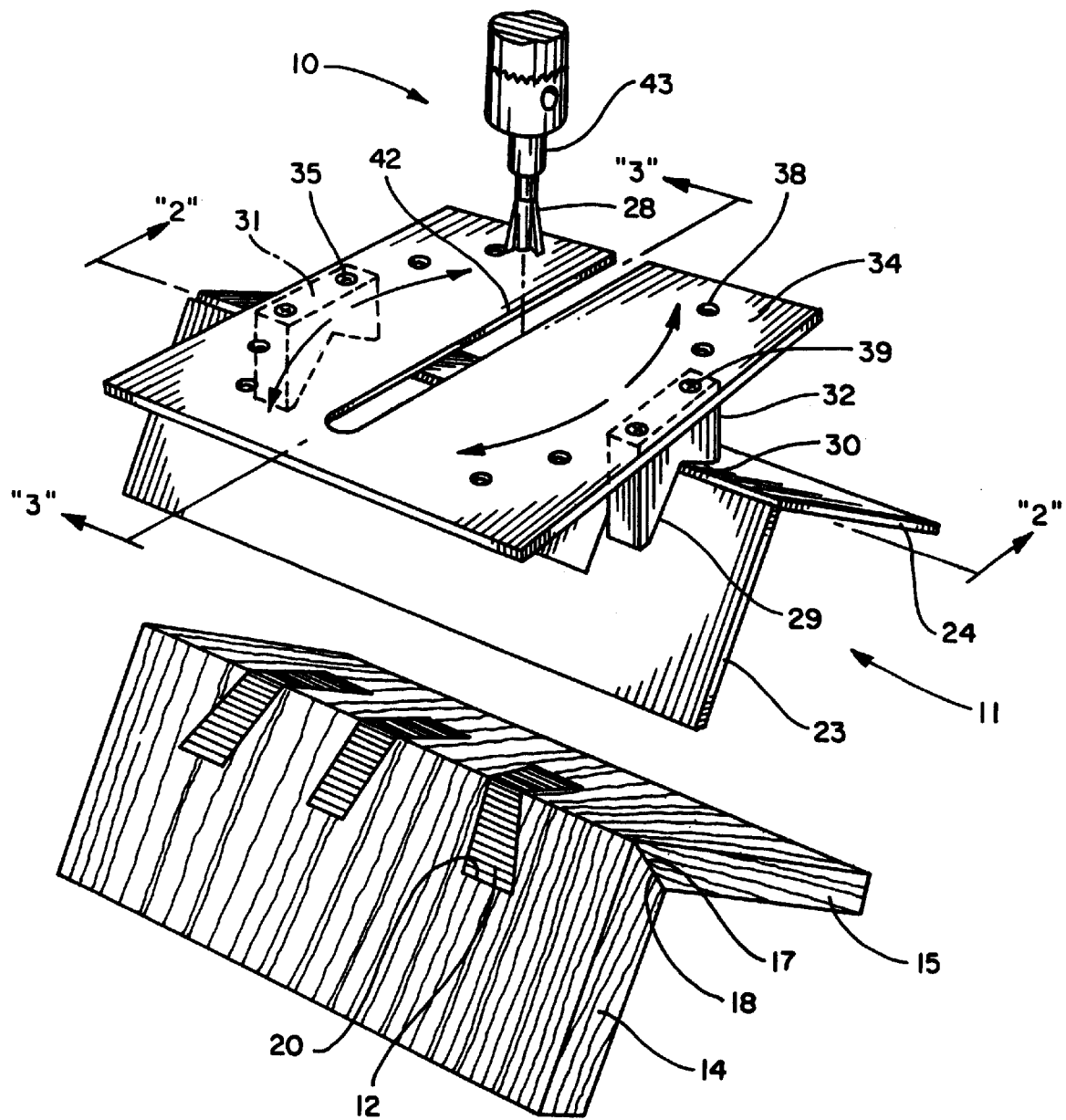
FIG. 1 is an exploded view including a portion of the routing machine, present work holder and tool guide, and a miter joint with the keys in situ.
Figure 10:
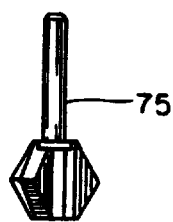
FIG. 10 is a side view of a hexagonal shaped routing cutter.
Figure 12:
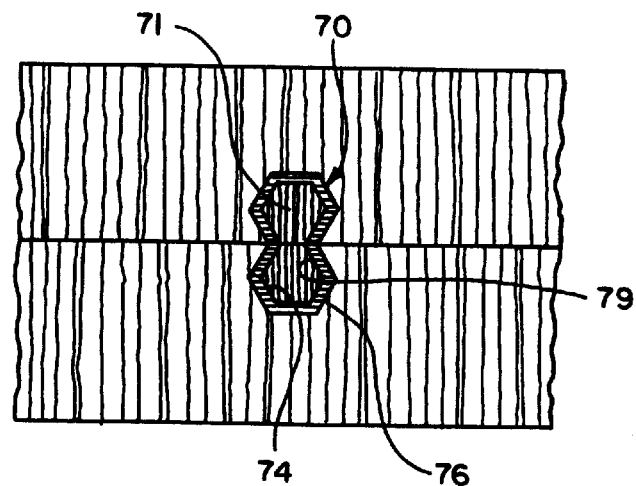
FIG. 12 is a top view of the exterior of a miter joint with key slot formed by the tools in FIGS. 10 and 11.
Figure 11:
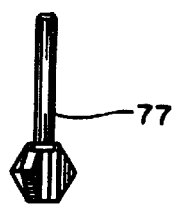
FIG. 11 is a side view of a smaller hexagonally shaped router cutter than illustrated in FIG. 10.

As seen in FIGS. 1 to 3, the present miter joint keying system is seen to generally include a routing machine 10, a work holder and tool guide assembly 11, and a plurality of keys 12 bonded at the corner of a miter joint formed by two boards 14 and 15 having mitered abutting end surfaces 17 and 18, with the keys 12 being bonded into slots 20 that extend through the exposed or outer surfaces of both boards 14 and 15.

The work holder and tool guide 11 is constructed of a plurality of pieces, plate and bar stock, of aircraft aluminum, and is seen to include a pair of flat rectangular workpiece engaging plates 23 and 24 having rectangular elongated cut-outs 26 in their upper surfaces, as seen in FIG. 2, to expose the outer surfaces of the joint to the routing cutter 28, which in FIGS. 1 to 4, is a tapered cutter, which of course cuts an upwardly converging tapered slot.

The plates 23 and 24 are screwed to the lower surfaces 29 and 30 of the V blocks 31 and 32.

A flat tool guide plate 34 is screwed, such as at 35, to the upper surfaces of the V blocks 31 and 32. There are a plurality of additional holes 38 in the tool guide plate 34 formed on the same radius as holes 39 about the center of plate 34 that permit the tool plate guide 34 to be indexed in a plurality of positions on the V blocks about an axis passing through and perpendicular to the center of plate 34, and this feature enables the tool guide to direct the cutter to cut angular slots at the joints such as shown by slot 40 at the right of FIG. 5.

It is helpful at this point to define the common plane that is referred to herein as the "miter plane", and this plane is the plane of the interengaging surfaces 17 and 18 at the miter joint as shown in FIG. 1.

The tool guide plate 34 has an elongated straight slot 42 therein that receives the cutting tool 28 and engages and guides the cutting tool by interengagement with a pilot guide 43 carried by the routing machine 44 adjacent its tool spindle. Pilot guide 43 does not rotate with the cutter 28, and as seen in FIG. 2, slot 42 has a width equal to the outer diameter of the pilot 43 so that there is no transverse motion between the router machine 44 with respect to the guide slot 42, as there is in dovetailing operations.

While the slot 42 is straight, and hence, all of the slots 20 illustrated in the drawings are straight, it should be understood that the slot could be curved so long as the radius of curvature is fixed. In this case, the keys 12 would have the same curvature in their longitudinal direction so that they could be inserted into the curved slot.

In use and as seen in FIGS. 2 and 3, the work holder and tool guide 11 is placed on an assembled miter joint with the lower router plate engaging the upper surface of the tool guide plate 34 and the cutting tool 28 projecting through the guide slot 42 away from but adjacent the joint board 15. The router is then started and slid across the plate 34, with the guide slot 42 guiding the pilot 43 while the tool passes through both boards in a direction generally transverse to the miter plane defined above.

Figure 13:
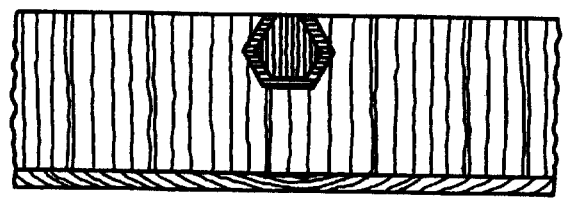
FIG. 13 is a side view of the miter joint illustrated in FIG. 12.

It should be understood that the cutter 28, regardless of its configuration, has a definable width in a plane at point 47, which is coincident with the tip of the miter joint when viewed from the side; i.e., such as the side views of FIGS. 6, 9 and 13. And it should be understood that the routing bits, according to the present invention, are "straight through" bits as will be apparent to those skilled, for example, in the woodworking art.

As seen in FIGS. 4, 5 and 6, both the left slot 49 and the right slot 50 are cut with cutter 28, also seen in FIGS. 1, 2 and 3. Left slot 49 is a perpendicular slot formed with the plate 34 in its FIG. 1 position, while slot 40 is formed with plate 34 indexed with respect to its FIG. 1 position utilizing apertures 38, to refastening plate 34 to V blocks 31 and 32.

Figure 17:
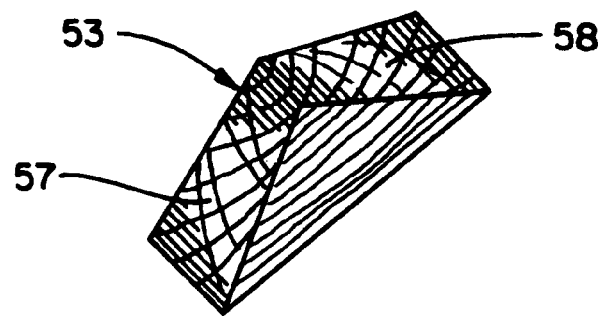
FIG. 17 is a perspective view of a typical key according to the present invention.
Figure 18:
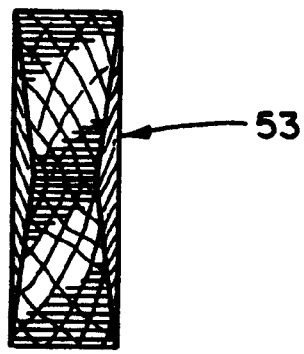
FIG. 18 is a too view of the key illustrated in FIG. 17.
Figure 19:
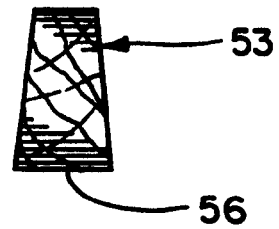
FIG. 19 is a front view of the key illustrated in FIGS. 17 and 18.

As seen in FIG. 3, the slots 49 and 40 have a flat bottom surface 50 in their axial direction and upwardly converging sides 51 and 52. Hence, the keys 53 and 54 have a flat bottom wall 56 and upwardly converging side walls 57 and 58(see FIGS. 17, 18, and 19 for a specific reference to key 53).

The shape of the slots in the direction orthogonal to the pass-through direction of the slots 49 and 40, is the same as the periphery of the cutting portions of the tool 28, bearing in mind that the depth of the cutter, of course, will change the depth of the slots.

FIGS. 8 and 9 illustrate the slot and key configuration with cutter 60 illustrated in FIG. 7, which is a straight-sided and straight-fluted cutter. Slot 61 is formed with the guide plate 34 indexed while slot 62 is formed with the guide plate 34 in its FIG. 1 position. Slots 61 and 62 have flat bottom walls 64 and spaced parallel side walls 65 and 66, and the keys 68 and 69 have a shape complementary to the slots 61 and 62.

FIGS. 10, 11, 12 and 13 illustrate a system for cutting and keying with a decorative dual inlay key ways including a five-sided key 70 and an internal five-sided key 71. This effect is achieved by initially cutting a first slot 74 through the miter with large hexagonal cutter 75, inserting and gluing the outer key way 76 in the slot 74, and then cutting slot 79 in outer key 76(which is solid when initially placed in slot 74), with a smaller tool 77, which creates slot 79. Then key 71 is inserted and bonded into slot 79.

Figure 14:
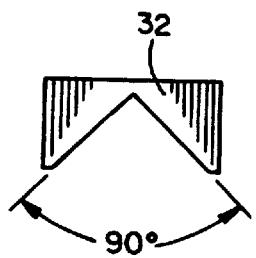
FIGS. 14, 15 and 16 are side views of V blocks that adapt the guide illustrated in FIGS. 1 to 3 to different angle joints.
Figure 15:
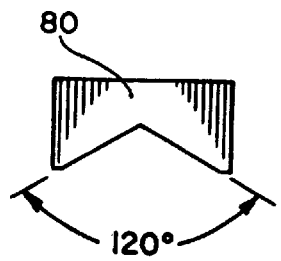
Figure 16:
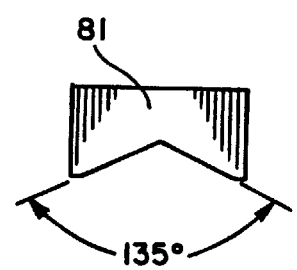

FIG. 14 illustrates V block 32, which has an included angle of 90 degrees. FIGS. 15 and 16 show V blocks 80 and 81 that have included angles of 120 and 135 degrees respectively for accommodating miter joints having greater angles. Blocks 80 and 81 can be easily replaced by disassembling the work holder and tool guide 11.

What is claimed is:

1. A miter joint key system, comprising: a work receiver including means for engaging both side boards at their juncture while in their assembled positions, said boards having engaging surfaces at their juncture lying in a common plane, and a tool guide fixed with respect to the work receiver having an aperture therein for permitting a routing cutter to pass therethrough, said tool guide also including tool guide surfaces generally transverse with respect to the common plane engageable with a portion of a routing machine adjacent the cutter, whereby the guide directs the cutting tool through the outer surfaces of both boards at their juncture forming a slot in both boards adapted to receive a generally triangularly shaped key having a cross sectional shape the same as the slot's cross section, said work receiver having two planar board engaging surfaces uninterrupted by screws or end pieces to accommodate boards of any length, said work receiver being unattached to a board underside clamping member whereby the key system can be used on assembled joints.

2. A miter joint key system, comprising: a work receiver including means for engaging both side boards at their juncture while in their assembled positions, said boards having engaging surfaces at their juncture lying in a common plane, a tool guide fixed with respect to the work receiver having an aperture therein for permitting a routing cutter to pass therethrough, said tool guide also including tool guide surfaces generally transverse with respect to the common plane engageable with a portion of a routing machine adjacent the cutter, whereby the guide directs the cutting tool through the outer surfaces of both boards at their juncture forming a slot in both boards, and a key for the slot having a triangular shape in a first direction and a cross sectional shape in an orthogonal direction the same as the slot cross section, said work receiver having two planar board engaging surfaces uninterrupted by screws or end pieces to accommodate boards of any length, said work receiver being unattached to a board underside clamping member whereby the key system can be used on assembled joints.

3. A miter joint key system, comprising: a work receiver including means for engaging both side boards at their juncture while in their assembled positions, said boards having engaging surfaces at their juncture lying in a common plane, and a tool guide fixed with respect to the work receiver having an aperture therein for permitting a routing cutter to pass therethrough, said tool guide also including tool guide surfaces generally transverse with respect to the common plane engageable with a portion of a routing machine adjacent the cutter, whereby the guide directs the cutting tool through the outer surfaces of both boards at their juncture forming a slot in both boards, wherein the tool guide is generally plane and lying in a plane, said tool guide being indexible, in a plane generally perpendicular to said common plane, so the cutter can cut slots at the board juncture at different angles.

4. A miter joint key system, comprising: a work receiver including means for engaging both side boards at their juncture while in their assembled positions, said boards having engaging surfaces at their Juncture lying in a common plane, and a tool guide fixed with respect to the work receiver having an aperture therein for permitting a routing cutter to pass therethrough, said tool guide also including tool guide surfaces generally transverse with respect to the common plane engageable with a portion of a routing machine adjacent the cutter, whereby the guide directs the cutting tool through the outer surfaces of both boards at their juncture forming a slot in both boards adapted to receive a generally triangularly shaped key having a cross sectional share the same as the slot's cross section said work receiver being adjustable to accommodate board angles of more than 90 degrees.

5. A tool guide for guiding a routing tool through a miter joint, comprising: a work holder including two planar members lying in intersecting planes both perpendicular to a common orthogonal plane, said planar member having means for engaging the outer surfaces of two boards while engaged with mating surfaces lying in a miter plane, and a planar tool guide member fixed to the planar members and having a slot therethrough for receiving a cutting tool and guiding the machine receiving the cutting tool, said slot being generally transverse to the miter plane so the cutting tool cuts a slot through both boards across the miter plane, said work holder having two planar board engaging surfaces uninterrupted by screws or end pieces to accommodate boards of any length, said work holder being unattached to a board underside clamping member whereby the tool guide can be used on assembled joints.

6. A tool guide for guiding a routing tool through a miter joint, comprising: a work holder including two planar members lying in intersecting planes both perpendicular to a common orthogonal plane, said planar member having means for engaging the outer surfaces of two boards while engaged with mating surfaces lying in a miter plane, and a planar tool guide member fixed to the planar members and having a slot therethrough for receiving a cutting tool and guiding the machine receiving the cutting tool, said slot being generally transverse to the miter plane so the cutting tool cuts a slot through both boards across the miter plane, said planar tool guide being indexible about an axis perpendicular to its own plane so it may guide the cutting tool to cut slots at angles other than 90 degrees with respect to the common plane.

7. A tool guide for guiding a routing tool through a miter joint, comprising: a work holder including two planar members lying in intersecting planes both perpendicular to a common orthogonal plane, said planar member having means for engaging the outer surfaces of two boards while engaged with mating surfaces lying in a miter plane, and a planar tool guide member fixed to the planar members and having a slot therethrough for receiving a cutting tool and guiding the machine receiving the cutting tool, said slot being generally transverse to the miter plane so the cutting tool cuts a slot through both boards across the miter plane, and a plurality of different angled "V" blocks supporting the work holder planar members to accommodate joints at angles other than 90 degrees.

8. A tool guide for guiding a routing tool through a miter joint as defined in claim 5, including a key for the slot having a triangular shape in a first direction and a cross sectional shape in an orthogonal direction the same as the slot cross section.

\* \* \* \* \*